Figure 1:
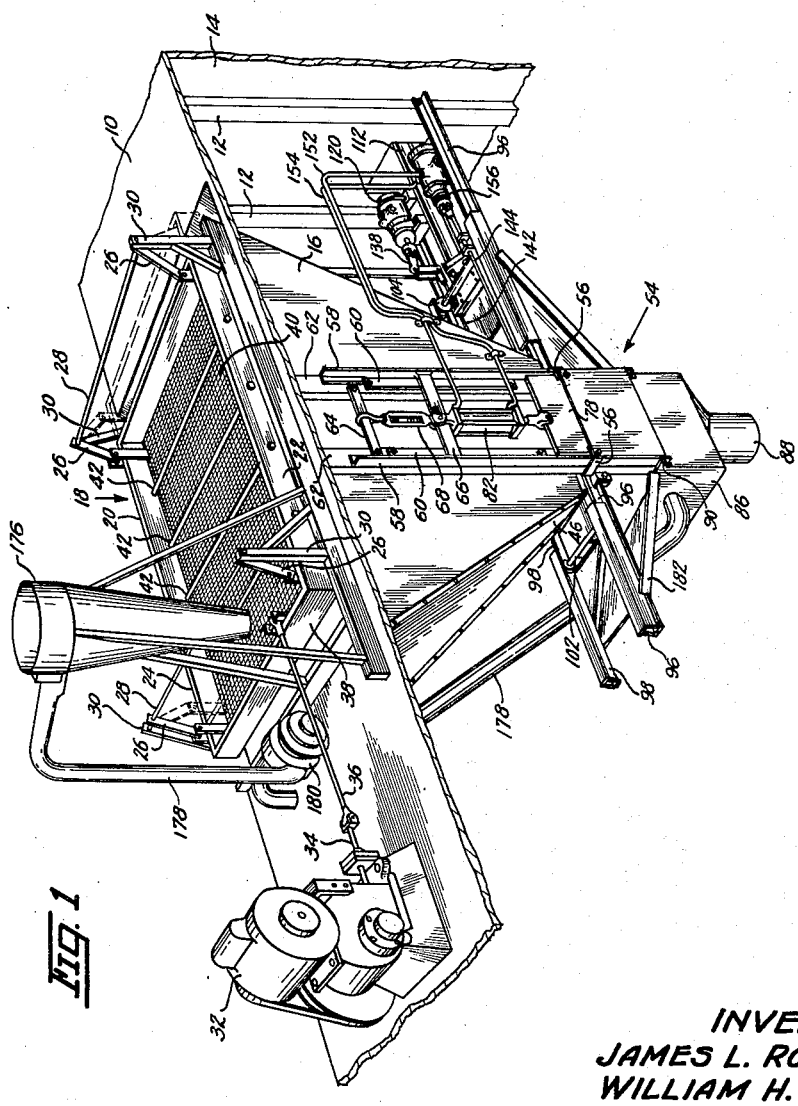

Oct. 29, 1963  J. L. ROACH ETAL  3,108,720
MATERIAL MEASURING AND BAG FILLING APPARATUS
Filed Aug. 22, 1961  4 Sheets-Sheet 3

INVENTORS.
JAMES L. ROACH
WILLIAM H. PAPE
WILLIAM H. EICKHOFF
WILLIAM F. ROACH

BY *Morton L. Adler*

ATTORNEY.

Oct. 29, 1963 J. L. ROACH ETAL 3,108,720
MATERIAL MEASURING AND BAG FILLING APPARATUS
Filed Aug. 22, 1961 4 Sheets-Sheet 4
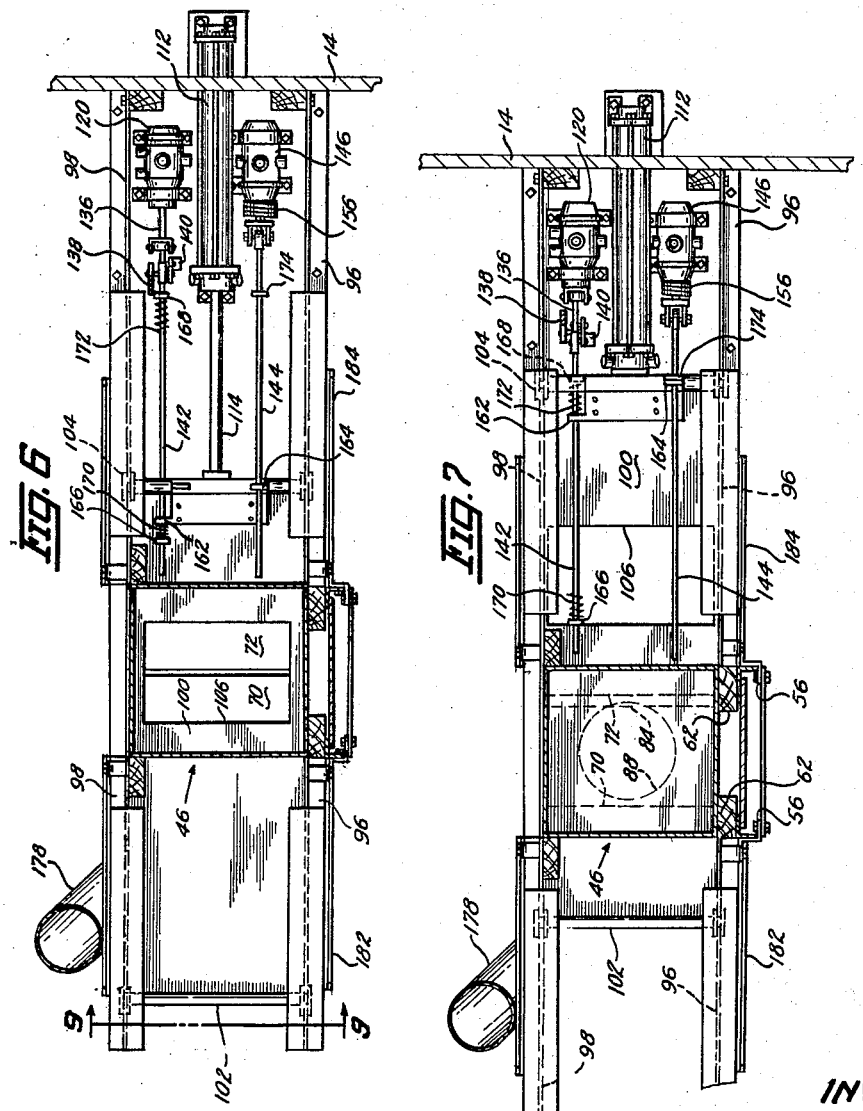
INVENTORS.
JAMES L. ROACH
WILLIAM H. PAPE
WILLIAM H. EICKHOFF
WILLIAM F. ROACH
BY Morton S. Adler
ATTORNEY.

United States Patent Office 3,108,720
Patented Oct. 29, 1963

3,108,720
MATERIAL MEASURING AND BAG FILLING
APPARATUS
James L. Roach, Plainfield, William H. Pape and William
H. Eickhoff, Waverly, and William F. Roach, Plainfield, Iowa, assignors to J. Roach Sons, Inc., Plainfield,
Iowa, a corporation of Iowa
Filed Aug. 22, 1961, Ser. No. 133,166
13 Claims. (Cl. 222—318)

This invention relates to apparatus for measuring uniform amounts of a flowable material, and while it will be described for use with packaging commercial fertilizer and was especially designed for that purpose, it will be apparent from the description which follows that it is not necessarily limited to such use.

Commercial fertilizer is packaged and sold generally in bags of a designated weight, such as fifty pounds, for example, and it is customary in packing such material, as with other commodities, to use scales to determine the proper weight per bag. While the type of scales used may vary, they can be characterized generally as having many parts of which some are rather delicate and sensitive and often include various electrical elements necessary in the proper functioning of the particular scale. Since fertilizer causes an extensive corrosive action on many materials, we have found from experience that such action periodically affects the ordinary weighing scale mechanism to such an extent that the scale must be frequently thoroughly cleaned, reconditioned and adjusted for accurate functioning. Obviously such necessary maintenance is time consuming and can shut down packaging operations unless a standby scale is available. In actual practice, we have found it necessary to maintain two scales whereby one is available for use while the other is being serviced.

With these observations in mind, the principal object contemplated by this invention is the provision of apparatus for measuring predetermined amounts of flowable material by volume and the automatic dispensing of such amounts into bags.

Another object herein is to provide a measuring and filling device as indicated that requires no springs, weights, electrical elements or the like associated with or subject to contact by the material being packaged. More particularly this invention includes a supply hopper connected for gravity feed to a measuring hopper or box of predetermined capacity together with an automatically operated gate for alternately opening and closing communication between said hoppers, and with a discharge means from the measuring hopper to a bag to be filled; such discharge means also being automatically operated and designed to open and close in relation to the respective closed and open position of said gate.

A further object inhering herein is to provide an apparatus of the above class wherein the capacity of the measuring hopper or box can be selectively varied to accomodate variations in quantities of different materials that may be necessary to obtain desired weights per bag.

Another object is to provide a reciprocating screen means for material passing into the supply hopper of this machine.

Still another important object herein is the provision of a novel arrangement of air actuated cylinders for effecting the automatic operation of the gate and discharge means used with this apparatus.

Another object is to provide pneumatic means for collecting and removing dust and overflow material from the measuring hopper and returning the overflow material to the supply hopper.

Further objects and the more obvious advantages of the invention will be mentioned or else appear plainly from the description which follows.

Figure 2:
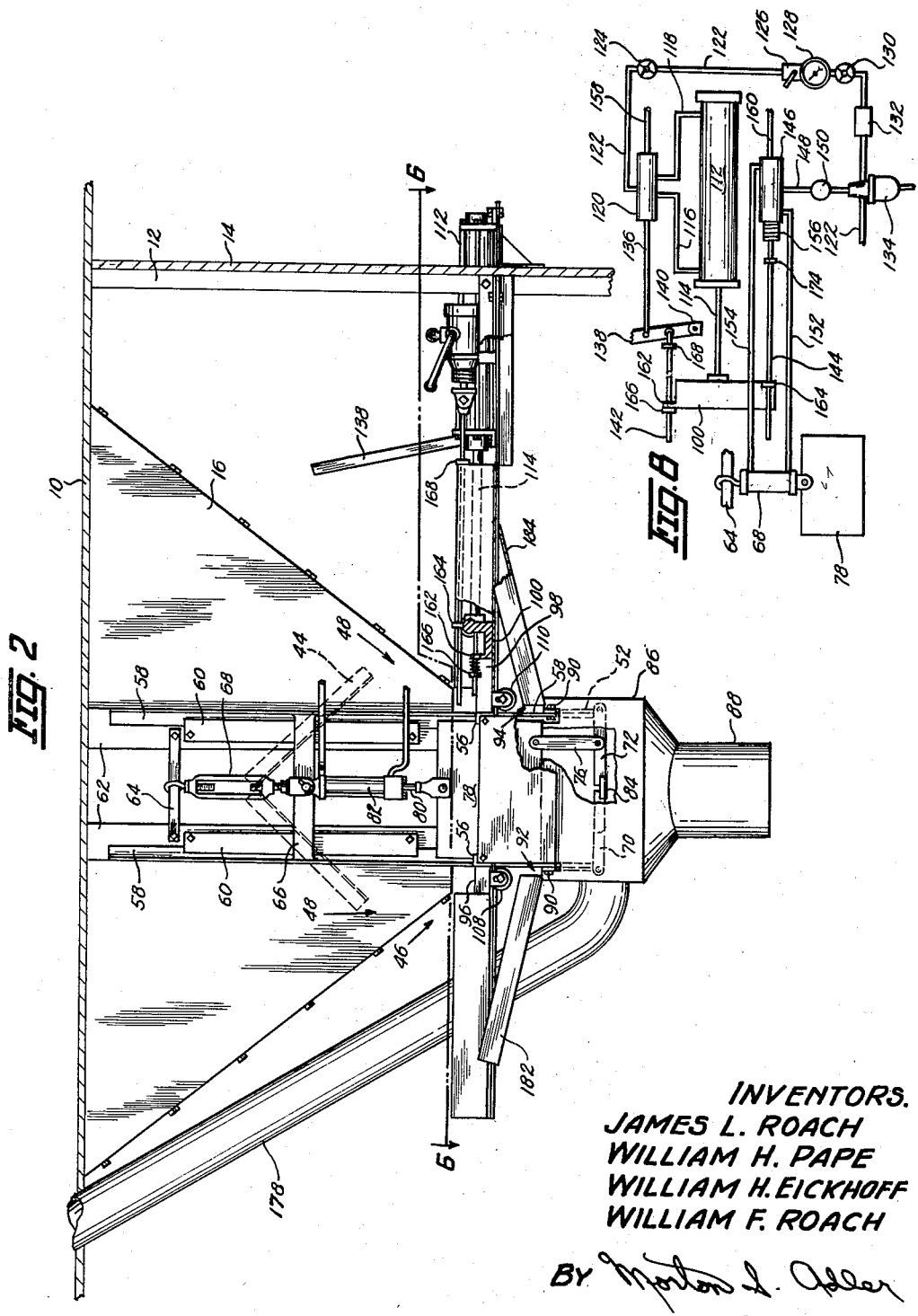
Figure 3:
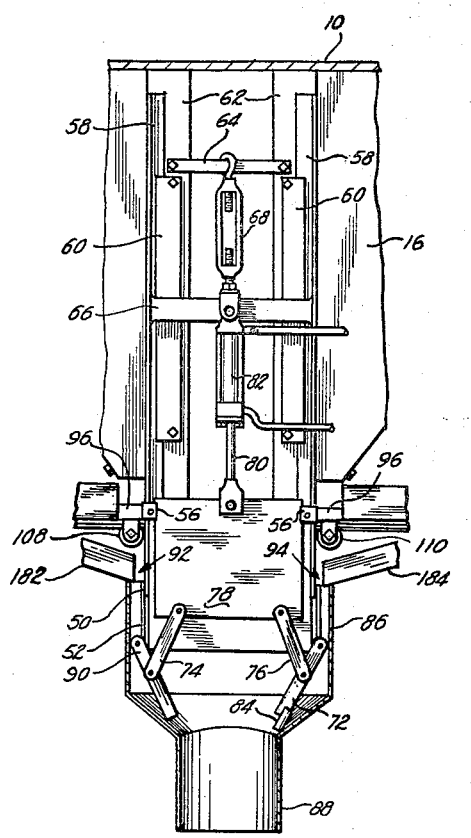
Figure 4:
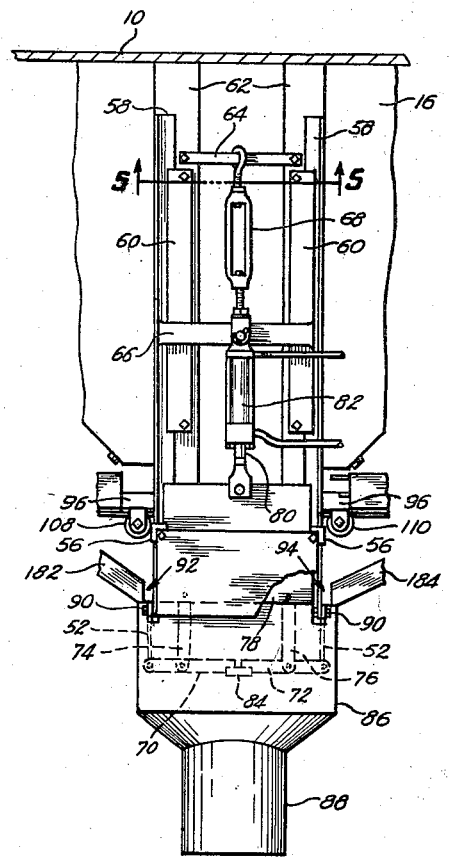
Figure 5:
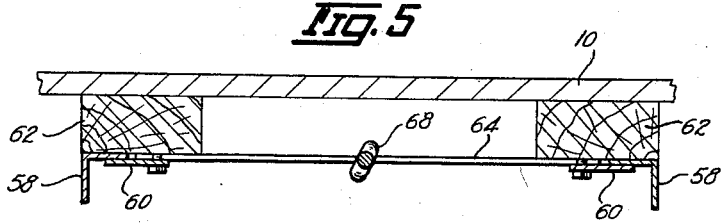
Figure 9:
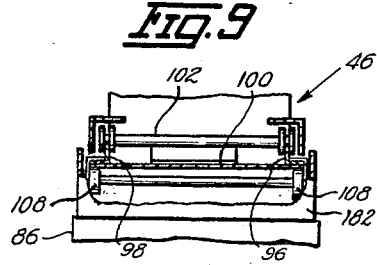

FIG. 1 is a perspective view showing a preferred embodiment of this invention and having portions of the outer closure broken away to more fully illustrate the operating mechanism, FIG. 2 is a side elevational view of the lower portion of the machine in FIG. 1, FIG. 3 is an enlarged elevational view of the measuring hopper or box showing the discharge clam doors in open position and illustrating the air cylinder connected to such doors, FIG. 4 is a view similar to FIG. 3 but showing the clam doors closed and illustrating the measuring hopper in extended position by reason of the lengthening of the turnbuckle above the air cylinder, FIG. 5 is a cross sectional view taken on the line 5—5 of FIG. 4, FIG. 6 is a plan view taken from the line 6—6 of FIG. 2 showing the gate between the supply and measuring hoppers in open position and the hopper doors closed, FIG. 7 is a view similar to FIG. 6 but showing the gate in closed position with the hopper doors open, FIG. 8 is a schematic view of the air cylinder and valve assembly used with this machine, and FIG. 9 is a cross sectional view taken on the line 9—9 of FIG. 6.

Referring to the drawings an elevated elongated platform 10 is supported as by posts 12 shown only at one end in FIG. 1 and the edges of platform 10 are illustrated in broken away form to indicate that such platform, if desired, may serve as the top of a complete enclosure represented by one end panel or wall 14. In the actual operating device we have enclosed the entire machine so that the enclosure forms a separate room but this is not necessary to the proper functioning of the machine as will become apparent. A material supply hopper 16 is secured to and depends from substantially the central portion of platform 10 so as to communicate with a receiving opening in the platform designated generally by the numeral 18. Superimposed over opening 18 is a rectangular screening box 20 designed to be longitudinally reciprocated or agitated relative to opening 18. For this purpose, box 20 is disposed between spaced rails 22 and 24 secured to platform 10 and at each end is pivotally connected by rigid links 26 to a transverse rod 28 supported at opposite sides of box 20 on standards 30 attached to rails 22 and 24 as shown in FIG. 1. On one end of platform 10, a suitable electric motor 32 has a reciprocating shaft 34 connected by a shaft extension 36 to one end 38 of box 20 so that such box may be reciprocated or agitated as indicated.

A screen 40 serves as the bottom of box 20 and the spaced transverse rods 42 shown between the longitudinal sides of box 20 are employed as a protection to screen 40 should material be dumped into box 20 from a scoop on a loader. With such a dumping method, it is possible for the scoop to damage the screen at times but if a conveyor is used, for example, rods 42 may, not be necessary. Within the hopper 16 there is an inverted V-shaped baffle member 44 as shown in FIG. 2 to deflect material passing through screen 40 and cause it to reach the discharge end 46 of the hopper by the passageways 48. In this way end 46 will not be clogged or choked by a direct fall of material.

The discharge end 46 of the supply hopper 16 communicates with the depending open bottom compartment or measuring hopper 50 which is preferably square and of a predetermined size so that when full, holds a fixed amount by weight of the material being packaged. In the device shown, hopper 50 is constructed to hold fifty pounds of commercial fertilizer. Encasing hopper 50 is the hopper extension 52 which is vertically slidable relative to hopper 50. Such sliding relationship is accomplished by securing the upper corner portions of the front side 54 (FIG. 1) of hopper extension 52 by means of clamp members 56. Bars 58 are slidably arranged in track means 60 which are mounted on suitable supports 62 that are in turn secured to the front side of hopper 16 as shown. Near the top of supports 62 a transverse bar 64 is secured thereto, and spaced below bar 64 and parallel thereto is the transverse bar 66 secured to the slide bars 58. A turnbuckle 68 connects bars 64 and 66 to effect the sliding relationship between hopper members 50 and 52 as disclosed.

At the bottom of the hopper extension 52 complementary clam-like door members 70 and 72 are pivotally secured at respective opposite sides. Each door is also connected by the respective rigid link 74 and 76 to the bottom of a vertically reciprocable plate 78 and the top of plate 78 is suitably secured to the outer end of a piston 80 on a two way air cylinder 82 attached to bar 66. Doors 70 and 72 serve as the bottom closure for hopper 50 with door 72 having the overlap lip 84 to prevent leakage, and from the above description it will be appreciated that the volume capacity of hopper 50 may be selectively increased by operation of the turnbuckle 68. A discharge chute or funnel 86 encases the lower end of the hopper extension 52 and contains the reduced spout portion 88 about which the neck of a sack to be filled (not shown) can be placed either manually or otherwise. Chute 86 is attached to the lower ends of the slide bars 58 by bolts 90 or the like and is spaced slightly outwardly from the sides of member 52 as indicated at 92 and 94.

At the discharge end 46 of hopper 16 we provide a pair of spaced parallel angle iron beams or rails 96 and 98 which are disposed on respective opposite sides of end 46 so as to project laterally from the right and left sides as seen in FIG. 1. An elongated plate or gate 100 is movable over rails 96 by the wheel assemblies 102 and 104 at respective end portions which ride on the vertical portion of such rails. Gate 100, intermediate its ends is provided with a hole or opening 106 for registering at times with the passageway through discharge end 46 into hopper 50 and, as will appear, the gate 100 is designed to reciprocate transversely of hopper 16 and box 50 to alternately open and close communication between the two. Fixed roller assemblies 108 and 110 serve as additional support below gate 100 as shown.

The operation of gate 100 and doors 70 and 72 is accomplished by an air pressure assembly supported between rails 96 and 98 (FIGS. 6 and 7) which we will now describe, with reference being made also to FIG. 8 showing a schematic arrangement thereof.

A two way air cylinder 112 has its piston rod 114 connected to one end of gate 100 so as to be capable of reciprocating gate 100 perpendicularly of the path of flow of material from hopper 16 to box 50. Cylinder 112 connects by air hoses 116 and 118 to a valve member 120 which in turn connects to the air supply line 122. Preferably line 122 includes an oiler device 124 of a well known type, a regulator 126, gauge 128, needle valve 130, pressure reducing valve 132 and water trap 134. Valve 120 is actuated by the operating rod 136 that is pivotally connected at its outer end to lever 138. Such lever is pivotally attached at one end to a support 140 and intermediate such support and rod 136 a second rod 142 projects in a horizontal plane toward end 46 and parallel and spaced from one longitudinal edge of gate 100. A third rod 144 parallel to rod 142 and similarly arranged relative to gate 100 on the opposite side thereof connects to an air valve 146 for operating the same. Valve 146 is connected by air line 148 through an oiler 150 and water trap 134 to the air supply line 122 and also connects by air hoses or lines 152 and 154 to the two way air cylinder 68 which operates doors 70 and 72 by connection therewith through plate 78. Valve 146 is set so that air pressure is normally present through line 152 to hold doors 70 and 72 closed, this being provided by spring 156 which maintains rod 144 in the proper position to keep line 152 open to air pressure. Exhaust lines 158 and 160 are provided for valves 120 and 146 respectively.

Secured to gate 100 in any suitable manner is a pair of trip members in the form of ears 162 and 164 positioned respectively to be slidable on the respective rods 142 and 144 as gate 100 is reciprocated. Ear or trip member 162 is designed for impact contact with a stop 166 on rod 142 near the end thereof closest to hopper end 46 and with a second stop 168 on rod 142 near lever 138. Both stops 166 and 168 are positioned behind respective springs 170 and 172 to cushion the impact as will be apparent. Ear or trip member 164 on rod 144 is adapted for a similar impact contact against a stop 174 on rod 144 near valve 146.

In operation the open position of gate 100 is shown in FIG. 6 where hole 106 in the gate registers with the path of flow between hopper 16 and the measuring box or hopper 50. Thus as material is dumped or fed into the box 20, it will flow over the baffle 44 through passageways 48 into box 50 to fill up the same. At this point doors 70 and 72 are closed so that material is in fact continuous from the bottom of hopper 50 up into hopper 16. Also initially, lever 138 will have been in a vertical or dead center position so that air pressure to cylinder 112 is closed. Thus by manually moving lever 138 off center in the proper direction, cylinder 112 is actuated to deliver air through line 116 for retracting gate 100, or as shown in FIGS. 6 and 7, to move it to the right and this moves a solid portion of gate 100 transversely of the path of material flow to effectively close communication between hoppers 16 and 50 whereby hopper 50 contains a full load of material for which the weight has been previously determined according to the box size and material involved.

As gate 100 is retracted as described, ears 162 and 164 move correspondingly longitudinally of rods 142 and 144 respectively for impact contact with the respective stops 168 and 174. Contact of ear 164 with stop 174 acts upon valve 146 to change the flow of air pressure from line 152 to 154 and thereby actuating cylinder 68 to open doors 70 and 72. At substantially the same time ear 162 abuts stop 168 which acts against lever 138 for operating valve 120. This changes the air stream in cylinder 112 from line 116 to line 118 whereby gate 100 is now reversed in its travel toward its open position. Doors 70 and 72 are opened only momentarily which is sufficient to permit the load in box 50 to drop by gravity through chute 88, and as soon as impact pressure on stop 174 is relieved by reverse movement of gate 100, spring 156 returns valve 146 to the position in relation to cylinder 68 where doors 70 and 72 are closed. As gate 100 returns to open position, box 50 will again be filled which is only a momentary operation and as the gate reaches the closed position, ear 162 enters into impact contact with stop 166 which also acts on lever 138 to operate valve 120 for reversing the air flow in cylinder 112 and the sequence of operation is thus repeated automatically until lever 138 is returned to dead center position.

Material discharged through chute 86 and spout 88 may fall on a conveyor in a well known manner with the total weight of any given amount being determined by the number of fillings of box 50. Preferably we have an operator hold a sack around spout 88 and as each load from box 50 is dropped the sack is carried by a conveyor to a sack stitching machine and a new sack is positioned about the chute. However, the disposition of the material may be varied without departing from the principles here disclosed.

It will be appreciated that in the above measuring operation there will be a good deal of dust and loose material that can interfere with satisfactory working conditions. To eliminate this factor we have placed a cyclone collector 176 on platform 10 disposed to discharge collected material back into box 20. A suitable conduit 178 connects collector 176 through a suitable air pump 180 to chute 86 for pneumatically withdrawing dust and loose material in a well known manner. Also material slide plates 182 and 184 are used as shown in FIGS. 1–4 for catching loose material resulting from movement of gate 100 and delivering it into chute 86 through the respective openings 92 and 94.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

We claim:

1. In a measuring and bag filling device, the combination of a material supply hopper, an open bottom measuring box of predetermined size disposed to receive material by gravity flow from said hopper, a gate intermediate said hopper and box, a first means to reciprocate said gate to alternately open and close communication between said hopper and box, a casing slidably embracing the lower portion of said box, door means on the bottom of said casing serving as the bottom of said box, a second means to open and close said door means so that the open and closed position thereof corresponds to the respective closed and open position of said gate, a source of power connected to said first and second means respectively, means on said gate acting on said first and second means respectively to actuate the same, and means to slide said casing relative to said box so as to selectively vary the size of said box.

2. In a measuring and bag filling device, the combination of a material supply hopper, an open bottom measuring box of predetermined size disposed to receive material by gravity flow from said hopper, a gate intermediate said hopper and box, a first means to reciprocate said gate to alternately open and close communication between said hopper and box, a casing slidably embracing the lower portion of said box, door means on the bottom of said casing serving as the bottom of said box, a second means to open and close said door means so that the open and closed position thereof corresponds to the respective closed and open position of said gate, a source of power connected to said first and second means respectively, means on said gate acting on said first and second means respectively to actuate the same, means defining a collecting chamber enclosing said casing, and a discharge spout attached to said collecting chamber for directing material into a bag.

3. In a measuring and bag filling device, the combination of a material supply hopper, an open bottom measuring box of predetermined size disposed to receive material by gravity flow from said hopper, a gate intermediate said hopper and box, means to reciprocate said gate to alternately open and close communication between said hopper and box, a casing slidably embracing the lower portion of said box, door means on the bottom of said casing serving as the bottom of said box, means to open and close said door means so that the open and closed position thereof corresponds to the respective closed and open position of said gate, means defining a collecting chamber enclosing said casing, and pneumatically operated material collecting means for removing surplus material from said collecting chamber and returning it to said hopper.

4. A device as defined in claim 1 including an inverted V-shaped baffle member disposed within said hopper directly above said measuring box in spaced relationship to the walls of said hopper to define a passageway for material.

5. In a measuring and bag filling device, the combination of a material supply hopper, an open bottom measuring box of predetermined size disposed to receive material by gravity flow from said hopper, a gate intermediate said hopper and box, a two way acting air cylinder connected to a source of air under pressure, an air valve associated with said air cylinder, said cylinder being connected to said gate for reciprocating the same to alternately open and close communication between said hopper and box, a lever connected to said air valve, a rod connected at one end to said lever and extending therefrom in parallel spaced relationship to said gate, a pair of stop members secured to said rod in longitudinal spaced relationship thereon, a trip member attached to said gate and slidable on said rod intermediate said stop members, initial actuation of said air cylinder by manually moving said lever effecting movement of said gate in one direction until said trip member abuts one of said stop members to move said lever and reverse the direction of said air cylinder whereby said trip member acts similarly on said other stop member so that reciprocation of said gate continues automatically until said lever is manually returned to dead center position, the point of contact between said trip member and said respective stop members defining the respective open and closed positions of said gate, a casing slidably embracing the lower portion of said box, door means on the bottom of said casing serving as the bottom of said box, means to open and close said door means so that the open and closed position thereof corresponds to the respective closed and open position of said gate, and means to slide said casing relative to said box so as to selectively vary the size of said box.

6. A device as defined in claim 5 wherein the means to open and close said door means includes a second two way acting air cylinder connected to a source of air under pressure, said second air cylinder being connected to said door means, a second air valve associated with said second air cylinder and normally positioned under spring tension to act against said second air valve to maintain said door means in closed position, a valve operating rod connected at one end to said second air valve and extending therefrom in parallel spaced relationship to said gate, a stop on said valve operating rod, a second trip member on said gate and slidable on said valve operating rod, movement of said gate to closed position effecting an impact contact by said second trip member with said stop causing said valve operating rod to act against said second air valve whereby said second air cylinder opens said door means and the contents of said box fall therefrom by gravity, and reversal of movement of said gate removing said stop from contact with said valve operating rod so that said second air valve in response to spring tension acts on said second air cylinder to move said door means to closed position.

7. In a measuring and bag filling device, the combination of a material supply hopper, an open bottom measuring box of predetermined size disposed to receive material by gravity flow from said hopper, a track transversely arranged intermediate said hopper and box, a gate slidable on said track so as to be capable of alternately opening and closing communication between said hopper and box, valved pneumatic means connected to said gate for reciprocating the same, means on said gate arranged to act on said valved pneumatic means whereby at each end of the gate travel in two opposite directions respectively said valve pneumatic means is acted upon to reverse the direction of its application of force and thereby cause said gate to automatically reciprocate, manual means for initially actuating and for deactuating said valved pneumatic means, door means on the bottom of said box, a second valved pneumatic means connected to said door means for opening and closing the same, and a second means on said gate connected to said second valved pneumatic means and arranged to act upon said second valved pneumatic means when said gate is in closed position to effect the rapid opening and closing of said door means so as to allow the contents of the box to fall therefrom by gravity.

8. In a measuring and bag filling device, the combination of a material supply hopper, an open bottom measuring box of predetermined size disposed to receive material by gravity flow from said hopper, a track transversely arranged intermediate said hopper and box, a gate slidable on said track so as to be capable of alternately opening and closing communication between said hopper and box, valved pneumatic means connected to said gate for reciprocating the same, means on said gate arranged to act on said valved pneumatic means whereby at each end of the gate travel in two opposite directions respectively said valve pneumatic means is acted upon to reverse the direction of its application of force and thereby cause said gate to automatically reciprocate, manual means for initially actuating and for deactuating said valved pneumatic means, a casing slidably embracing the lower portion of said box, door means on the bottom of said casing serving as the bottom of said box, a second valved pneumatic means connected to said door means for opening and closing the same, a second means on said gate connected to said second valved pneumatic means and arranged to act upon said second valved pneumatic means when said gate is in closed position to effect the rapid opening and closing of said door means so as to allow the contents of the box to fall therefrom by gravity, and means to slide said casing relative to said box so as to selectively vary the size of said box.

9. In a measuring and bag filling device, the combination of a material supply hopper, an open bottom measuring box of predetermined size disposed to receive material by gravity flow from said hopper a track transversely arranged intermediate said hopper and box, a gate slidable on said track so as to be capable of alternately opening and closing communication between said hopper and box, valved pneumatic means connected to said gate for reciprocating the same, means on said gate arranged to act on said valved pneumatic means whereby at each end of the gate travel in two opposite directions respectively said valve pneumatic means is acted upon to reverse the direction of its application of force and thereby cause said gate to automatically reciprocate, manual means for initially actuating and for deactuating said valved pneumatic means, a casing slidably embracing the lower portion of said box, door means on the bottom of said casing serving as the bottom of said box, a second valved pneumatic means connected to said door means for opening and closing the same, a second means on said gate connected to said second valved pneumatic means and arranged to act upon said second valved pneumatic means when said gate is in closed position to effect the rapid opening and closing of said door means so as to allow the contents of the box to fall therefrom by gravity, means to slide said casing relative to said box so as to selectively vary the size of said box, means defining a collecting chamber enclosing said casing, and a discharge spout attached to said collecting chamber for directing material into a bag.

10. In a measuring and bag filling device, the combination of a material supply hopper, an open bottom measuring box of predetermined size disposed to receive material by gravity flow from said hopper, a track transversely arranged intermediate said hopper and box, a gate slidable on said track so as to be capable of alternately opening and closing communication between said hopper and box, valved pneumatic means connected to said gate for reciprocating the same, means on said gate arranged to act on said valved pneumatic means whereby at each end of the gate travel in two opposite directions respectively said valve pneumatic means is acted upon to reverse the direction of its application of force and thereby cause said gate to automatically reciprocate, manual means for initially actuating and for deactuating said valved pneumatic means, a casing slidably embracing the lower portion of said box, door means on the bottom of said casing serving as the bottom of said box, a second valved pneumatic means connected to said door means for opening and closing the same, a second means on said gate connected to said second valved pneumatic means and arranged to act upon said second valved pneumatic means when said gate is in closed position to effect the rapid opening and closing of said door means so as to allow the contents of the box to fall therefrom by gravity, means to slide said casing relative to said box so as to selectively vary the size of said box, means defining a collecting chamber enclosing said casing, and pneumatically operated material collecting means for removing surplus material from said collecting chamber and returning it to said hopper.

11. In a measuring device for free flowing material, the combination of a material supply hopper, an open bottom measuring box of predetermined size disposed to receive material by gravity flow from said hopper, a gate intermediate said hopper and box, means to reciprocate said gate to alternately open and close communication between said hopper and box, a casing slidably embracing the lower portion of said box, openable and closable door means on the bottom of said casing serving as the bottom of said box and operable so that the open and closed position thereof corresponds to the respective closed and open position of said gate, a valved pneumatic means connected to said door means for opening and closing the same, and means on said gate and arranged to act upon said valved pneumatic means when said gate is in closed position to effect the rapid opening and closing of said door means so as to allow the contents of the box to fall therefrom by gravity.

12. In a measuring and bag filling device, the combination of a material supply hopper, an open bottom measuring box of predetermined size disposed to receive material by gravity flow from said hopper, a gate intermediate said hopper and box, means to reciprocate said gate to alternately open and close communication between said hopper and box, a casing slidably embracing the lower portion of said box, clam-like doors on the bottom of said casing serving as the bottom of said box, a plate disposed for a vertical reciprocation and connected to said doors to open and close the same so that the open and closed position thereof corresponds to the respective closed and open position of said gate, pneumatic means connected to said plate for reciprocating it, said pneumatic means being actuated by movement of said gate to closed position, and means to slide said casing relative to said box so as to selectively vary the size of said box.

13. In a measuring and bag filling device, the combination of a material supply hopper, an open bottom measuring box of predetermined size disposed to receive material by gravity flow from said hopper, a gate intermediate said hopper and box, a casing slidably embracing the lower portion of said box, door means on the bottom of said casing serving as the bottom of said box, means to slide said casing relative to said box so as to selectively vary the size of said box, a valved pneumatic assembly connected through a first valve to said gate to reciprocate the same for alternately opening and closing communication between said hopper and box and also connected through a second valve to said door means for opening and closing the same, and means on said gate acting on said first and second valves respectively so that the open and closed position of said gate corresponds respectively to the closed and open position of said door means.

References Cited in the file of this patent
UNITED STATES PATENTS

| | | |
|---|---|---|
| 534,082 | Reeder | Feb. 12, 1895 |
| 922,085 | Chamberlain | May 18, 1909 |
| 1,027,177 | Case et al. | May 21, 1912 |
| 1,032,190 | Crosby | July 9, 1912 |
| 1,360,805 | Sherman et al. | Nov. 30, 1920 |